Patented Nov. 12, 1940

2,221,018

UNITED STATES PATENT OFFICE 2,221,018

TREATMENT OF WASTE SOLUTIONS CONTAINING METALS

Gustave B. Bachman and Stephen C. Pool, Rochester, N. Y., assignors to Eastman Kodak Company, Rochester, N. Y., a corporation of New Jersey No Drawing. Application May 13, 1939,
Serial No. 273,549

11 Claims. (Cl. 75—118)

This invention relates to the treatment of waste solutions containing valuable metals, metal salts and other valuable components for rendering the solutions in improved form for recovering the valuable components and more particularly to the treatment of waste photographic solutions containing silver, silver salts, halides and the like, to render said solutions in improved condition for the recovery of silver and other valuable components therefrom by treatment including flocculation and settling.

As pointed out in certain prior patents, as for example Hickman et al. Patent 2,131,045 and Reid Patent 2,131,072, waste solutions from photographic processes which contain silver components may be treated for recovering these valuable components. In some instances the treatment includes treating the waste solution with a flocculating agent which causes the deposition of a silver-containing sludge. After settling, the supernatant liquid above this sludge may be withdrawn. In the operation of such processes, in some instances a difficulty occurs known as a "boil-up." That is, during the addition of reagents to the waste solutions and/or during subsequent settling apparently a gas forms in the material containing the valuable constituents before it has settled completely as a sludge and causes some of the coagulated mass to rise to the surface, thereby interfering with the settling. Such gas formation may set up currents within the waste solutions detrimental to obtaining the best separation of the sludge containing the valuable metals, salts, or other components. Consequently, when the treated solutions are discharged to waste, a certain amount of valuable materials may be carried away therein.

We have found that this difficulty may be minimized to a substantial extent and the processing of waste solutions containing amounts of valuable materials considerably improved, for example, by incorporating with the solutions being processed or to be processed, certain agents which apparently either reduce the gas-forming tendency, minimize the action thereof, or otherwise overcome the difficulty.

This invention has for one object to improve the treatment of waste solutions which are being processed to recover valuable constituents therefrom. Another object is to provide a treatment which prevents and minimizes "boil-ups" during the processing of waste solutions containing valuable metallic or other components. Still another object is to provide a treatment particularly useful for the improvement of waste photographic solutions prior to or during the recovery of valuable components therefrom. Still another object is to provide a method for treating photographic solutions which are being subjected to silver recovery methods. Other objects will appear hereinafter.

We have found that waste solutions containing valuable components may be prevented from "boil-ups" or such "boil-ups" considerably minimized by the incorporation therewith of one or more sludge degasifying agents, similar surface active compounds, or other agents.

The structure of such compounds will usually be characterized by at least one water insoluble or hydrophobic group, and at least one water soluble or hydrophylic group. As a hydrophobic group an alkyl group containing from 8 to 20 carbon atoms or two such groups containing a total of from 10 to 20 carbon atoms will be suitable. Alkyl aromatic and cycloaliphatic groups containing from 10 to 20 carbon atoms also constitute satisfactory hydrophobic groups. More than one of these various groups and combinations of them may be employed. As hydrophylic groups such groups as hydroxyl, amine, carboxyl, sulfonic, sulfate, phosphate, xanthate, ammonium, phosphonium or combinations of these may be used. Other inert groups such as ether, ester, or halogen groups may also be present. Examples of some of the general types of compounds having the above described structures are as follows:

Quaternary ammonium salts
Aliphatic sulfates and sulfonates
Aromatic sulfates and sulfonates
Aliphatic xanthates
Sulfonated natural fats and oils These agents may be used in various amounts, as for example to obtain 0.0005% and 0.1% concentration in the bath. Larger quantities may be added, if desired, being merely dependent on increased cost in proportion to the added recovery obtained. For example, the addition of 4% or 5% could be made, but we have found that the aforementioned amounts give the desired results, and at lower cost.

An example of a specific use of such compounds is as follows:

About a 30,000 gallon batch of waste photographic solution containing a small concentration of silver suspended in the form of the metal and its halides was tapped into a suitable treating reservoir. Prior to treating about 12½ lbs. of sodium keryl (alkyl group derived from kerosene) benzene sulfonate was added. This gave a concentration of approximately 0.005% of surface active material. Thereafter alkali and aluminum sulfate were added to produce a floc at pH 7. The floc was allowed to settle. In so doing it carried with it the silver sludge leaving a supernatant liquid which was clear and relatively free of silver. During the treatment no gassing sufficient to re-disperse the floc occurred. Consequently, losses of silver-containing floc into the supernatant liquid were minimized.

As specific examples of surface active compounds which we have found satisfactory the following are included:

Quaternary ammonium salts
    Laurylpyridinium p-toluene sulfonate
    Dimethyllaurylglycinium betaine
    Dimethylbenzylcetylammonium chloride
        Commercial product—Triton K-60
    Lauryl amine
Aliphatic sulfates
    Sodium lauryl sulfate
        Commercial product—Duponol WA, Gardinol WA
    Sodium oleyl glyceryl sulfate
Aliphatic sulfonates
    Sodium N-oleyl taurate
        Commercial product—Igepon T
Aromatic sulfonates
    Sodium alkyl benzene sulfonates
        Commercial product—Nacconol NR
    Sodium alkyl phenol sulfates
        Commercial product—Nacconol AX
    Sodium alkyl aromatic sulfonates from naphthalene, tetrahydronaphthalene, diphenyl, abietene, and other polycyclic benzenoid hydrocarbons
        Commercial product—Novonacco, Aresket Alkanol S, Neopen SS
Aliphatic xanthates
    Amyl xanthate, sodium
        Commercial product — Pentasol amyl xanthate Z-6
Sulfonated natural fats and oils
    Sulfonated castor oil
        Commercial product—Nopcocastor For a further understanding of our invention we offer the following explanation of the action which may take place. It is to be understood, however, that we do not wish to be bound by any particular theory of operation but merely set forth certain explanations which may represent in a general way the mechanism of our process. The waste solutions being treated in addition to the valuables such as metallic constituents, halides, salts, elements and the like, may also contain certain proteinaceous matter. Under storage conditions and other conditions of handling or treatment such decomposable constituents may become inoculated with bacteria, enzymes, or other similar organisms which act upon the protein constituents and cause decomposition. This decomposition produces the liberation of gas aforementioned which during its movement toward the surface of the bath handicaps settling and otherwise presents difficulties. Our addition of reagent may act to reduce the capacity of the floc to retain the gas, thereby minimizing the effect of the gassing. Or, our treatment may diminish or eliminate the aforementioned decomposition reactions which produce the gassing. It is also possible that a combination of actions may be involved.

In further detail, we may add agents, of which a number have been set forth above, (for example sulfonated natural fats and oils) that act on the particles of floc or sludge which contain the valuable component to be recovered, causing it to wet easily or otherwise acting upon the surface of the particle and liberating gas therefrom. We may add agents such as the xanthates, sulfides, cyanides, arsenic derivatives, quaternary ammonium salts, acids, lead salts, and the like, which actually poison, destroy, or otherwise inhibit the action of the bacillus or enzymes which may be responsible for the gas forming; hence, in this manner eliminating "boil-ups" at the onset. We may add compounds comprising polyhydric alcohol esters of fatty acids. The compounds added may be ones which will ionize or if desired, the compounds added may be non-ionic such as, for example, diglycol laurate, or glycerol oleate. The agents added may function in accordance with one or more of the above-described actions.

For convenience of reference, we may refer to the above compounds as sludge degasifiers or sludge improving agents. By anti-enzymatic compounds we mean in particular those compounds which inhibit, prevent, restrain or destroy the action of enzymes.

As indicated above, our process is particularly applicable to the recovery of silver salts from waste photographic solutions. As described, the waste solutions may be treated prior to or during deposition of a sludge. The deposition of sludge carries down the valuable silver salt as a component part of the sludge and the valuable silver salt may be recovered from the sludge. As by the procedure set forth in the patents aforementioned, in a similar manner palladium, rare metals, or other valuable constituents and/or their salts may be recovered. The waste solutions may contain iodine, bromine, or various salts thereof, and in a similar manner our treating process improves the waste solutions and sludge for the recovery of these compounds. Other valuable compounds in the presence of proteinaceous materials which tend to decompose and liberate gas, which interferes with the recovery of the valuable constituents may be treated in a comparable manner. For convenience of reference, we generically refer to the compounds merely as valuable components.

We have found that a wide variety of compounds are effective in producing the aforementioned improvement. It is therefore apparent that our invention is susceptible of some modification; hence, we do not wish to be restricted, excepting insofar as may be necessitated by the prior art and the spirit of the appended claims.

What we claim and desire to be secured by Letters Patent of the United States is:

1. A method of recovering silver component from waste photographic solutions containing said component, proteins and other constituents, and having a tendency to gas when treated with flocculating agents, which comprises incorporating with said solution an agent from the group consisting of quaternary ammonium salt, aliphatic sulfates, sulfonated natural fats and oils with free acid groups, agents with free sulfonic acid groups, aromatic sulfonates, aliphatic sulfonates and lauryl pyridinium p-toluene sulfonate, and subsequent to or during said incorporation processing the solution for the recovery of said silver component.

2. A process of treating waste photographic solutions containing small amounts of silver-containing constituents and various organic constituents, which comprises incorporating therewith a compound containing a long hydrophobic group attached to a hydrophylic group to obtain a concentration of at least 0.005% to 0.1% in said waste photographic solution and processing the treated solution for recovering silver constituent therefrom.

3. In a process of recovering valuable metallic constituents from waste aqueous photographic solutions containing only a small content thereof in the presence of decomposable materials, the step which comprises treating such solutions with a small amount of a sulfonated compound having 8–20 carbon atoms in the molecule.

4. In a process of recovering valuable metallic constituents from waste photographic solutions containing only a small content thereof in the presence of decomposable materials, the step which comprises treating such solutions with a small amount of quaternary ammonium salt.

5. In a process for treating waste photographic solutions containing a valuable silver component as well as decomposable organic materials by treatment including flocculation of the silver component and then settling of the floc as a sludge, the step which comprises improving said solution by treatment thereof with a small amount of at least one of the agents from the group consisting of quaternary ammonium salts, aliphatic sulfates, sulfonated natural fats and oils with a free acid group, aromatic sulfonates, aliphatic sulfonates and xanthates.

6. A method for recovering the valuable silver component from waste photographic solutions containing said component in the presence of decomposable organic materials which comprises treating the solution with various salts including an aluminum salt to cause the formation of a floc which carries down the silver constituent as a sludge, and subjecting the treated solution to settling for causing deposition of said sludge and during the process prior to the completion of said settling, incorporating at least one agent having a hydrophobic group and a hydrophylic group and containing at least from 8–20 carbon atoms, in the molecule.

7. In a process for the recovery of valuable components from waste photographic solutions containing the valuable components in the presence of decomposable matter which tends to produce gas interfering with the recovery of the valuable components, the step which comprises treating the waste solutions with an agent containing at least one hydrophobic group and at least one hydrophylic group, for improving the solution and subsequently subjecting the solution to a recovery process including settling for obtaining a sludge containing the valuable component.

8. In a process for the recovery of valuable components from waste photographic solutions containing the valuable components in the presence of decomposable matter which tends to produce gas interfering with the recovery of the valuable components, the step which comprises treating the solution with a sludge degasifier essentially comprising an organic compound having a hydrophobic group and a hydrophylic group and containing at least from 8–20 carbon atoms in the molecule for facilitating the recovery of the valuable component as a sludge said sludge degasifier being further characterized in that it is of a different composition than the materials used in forming the sludge.

9. In a process for the recovery of valuable components from waste photographic solutions containing the valuable components in the presence of decomposable matter which tends to produce gas interfering with the recovery of the valuable components, the step which comprises treating the solution with an anti-enzymatic compound which inhibits or destroys the gas-forming agents in the solution which cause the gas formation said anti-enzymatic compound being employed in addition to flocculation agents.

10. A process for treating solutions containing valuable metallic components as well as decomposable organic materials by treatment including flocculation of the metallic component and settling of the floc as sludge, the step which comprises improving said solution by treatment thereof with a small amount of an agent having a hydrophobic group and a hydrophylic group and contatining at least from 8–20 carbon atoms in the molecule.

11. In a process for treating solutions containing valuable components as well as decomposable organic materials, by treatment including flocculation of at least some of the valuable components, and settling of the floc, the step which comprises improving said solution by treatment thereof with a small amount of at least one agent from the group consisting of quaternary ammonium salts, aliphatic sulphates, sulphonated natural fats and oils with a free acid group, aromatic sulphonates, aliphatic sulphonates and xanthates.

GUSTAVE B. BACHMAN.
STEPHEN C. POOL.